Dec. 7, 1965  W. J. FONTENOTE ETAL  3,222,586
SHUNT MOTOR CONTROL CIRCUIT
Filed April 13, 1962  2 Sheets-Sheet 1

W.J. Fontenote
E.D. Lobb
INVENTORS

BY John G. Graham

Dec. 7, 1965   W. J. FONTENOTE ETAL   3,222,586
SHUNT MOTOR CONTROL CIRCUIT

Filed April 13, 1962   2 Sheets-Sheet 2

W. J. Fontenote
E. D. Lobb
INVENTORS

BY John A. Graham

United States Patent Office 3,222,586
Patented Dec. 7, 1965

3,222,586
SHUNT MOTOR CONTROL CIRCUIT
William J. Fontenote, Dallas, and Earl D. Lobb, Garland, Tex., assignors to Texas Instruments Incorporated, Dallas, Tex., a corporation of Delaware
Filed Apr. 13, 1962, Ser. No. 187,412
5 Claims. (Cl. 318—308)

This invention relates to a system utilizing semiconductor controlled rectifiers for supplying direct current to a load from an alternating current source. More particularly, this invention relates to a D.C. shunt motor control circuit employing saturable reactors in the gate circuits of controlled rectifiers.

It is a principal object of this invention to provide an improved supply system for a variable load by employing semiconductor controlled rectifiers. Another object is to provide a D.C. shunt motor control system which utilizes saturable reactors in the gate circuits of controlled rectifiers. A further object is to provide a D.C. shunt motor control which is simple, inexpensive, and requires a minimum of components.

In accordance with this invention, a controlled rectifier is connected in series with an A.C. source and a variable load which may be the armature of a shunt motor. This may be in a bridge arrangement utilizing two controlled rectifiers in adjacent arms of the bridge. The gates of the controlled rectifiers are coupled to the A.C. source through saturable reactors. A fixed bias is applied to the cores of the saturable reactors while a variable control current is applied to a control winding linking the cores, this control current being determined by the desired speed of the motor. A potential related to the actual motor speed is also applied to the control winding in opposition to the selected control voltage.

The novel features believed characteristic of this invention are set forth with particularity in the appended claims. The invention itself, however, along with further objects and advantages thereof, may best be understood from the following detailed description of particular embodiments, when read in conjunction with the accompanying drawings, wherein:

Figure 1:
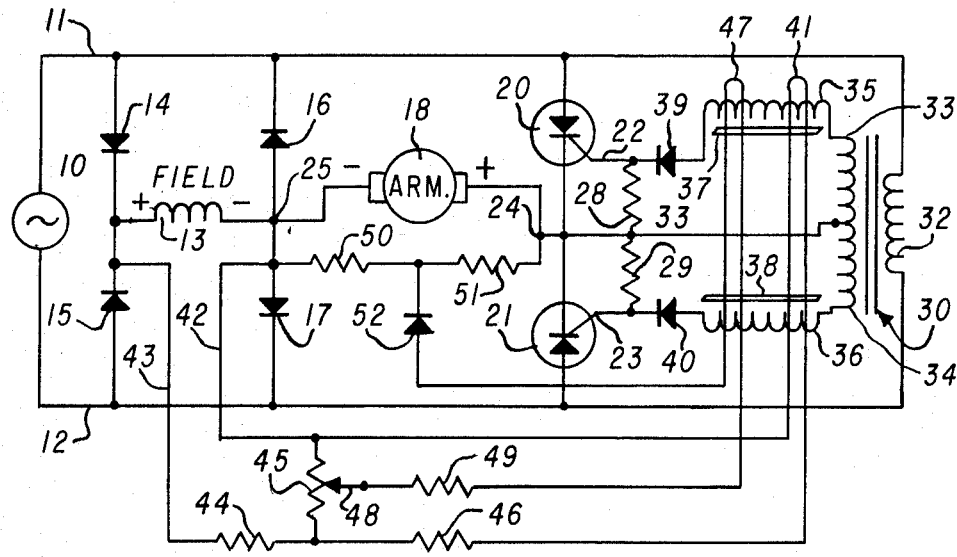
FIGURE 1 is a schematic diagram of a motor speed control circuit incorporating the principal features of this invention.

With reference to FIGURE 1, a shunt motor control circuit is illustrated which utilizes a pair of controlled rectifiers in a bridge circuit to control the motor armature current. A saturable reactor arrangement is utilized to control the firing of the gates of the controlled rectifiers in accordance with this invention. An alternating current source 10, which may be the usual 115 volt 60 cycle power, is connected to a pair of input supply lines 11 and 12. A shunt field winding 13 for the motor is connected to these lines by a full-wave-bridge rectifier including four diodes 14–17. An armature winding 18 for the motor is connected to the supply lines by a second full-wave-bridge rectifier including a pair of controlled rectifiers 20 and 21 along with the diodes 16 and 17. These controlled rectifiers 20 and 21 may be of the PNPN silicon type and include anodes connected to the lines 11 and 12, gates 22 and 23, and cathodes connected together at a junction 24. The diodes 16 and 17 are common to both of the bridge rectifiers, and a juncture 25 between these two diodes provides a common negative terminal for both the field and the armature. With the arrangement thus far described it is seen that direct current, or full-wave rectified A.C., will be supplied to the field winding 13 at a substantially constant value while pulsating unidirectional current will be supplied to the armature winding 18 to the extent that the controlled rectifiers 20 and 21 are conductive during alternate half cycles.

Firing potentials for the gates 22 and 23 are supplied by a saturable reactor arrangement driven from a transformer 30 which has a primary winding 32 connected across the supply lines 11 and 12. This transformer includes a pair of secondary windings 33 and 34 having a common point connected to the junction 24 of the cathodes. The outer terminals of the secondary windings are connected to the gates 22 and 23 through reactor windings 35 and 36 on saturable cores 37 and 38, and through series diodes 39 and 40. The cores 37 and 38 would tend to be saturated by current flowing through the windings 35 and 36 in the directions permitted by the diodes 39 and 40. Thus, absent further bias for the cores, these windings 35 and 36 would offer little impedance and the gates 22 and 23 would be driven with voltages adequate to fire the controlled rectifiers at the beginning of each alternate half cycle. It is preferable to bias the controlled rectifiers toward nonconduction, and so a bias winding 41 encircles both of the saturable cores 37 and 38 and is driven by a bias current adequate to reset the cores after each alternate half cycle. The bias winding 41 is excited by a bias potential which may be derived from across the field 13 or across the output of the first bridge rectifier. This field voltage is applied by a pair of lines 42 and 43 to a voltage divider comprising a fixed resistor 44 and a potentiometer 45. The junction between these resistors is connected to one end of the bias winding 41 through a resistor 46, while the other end of the bias winding is connected directly to the line 42. Current in the bias winding would saturate the cores 37 and 38 in a direction opposite to the flux produced by the windings 35 and 36 and so would prevent firing voltages from ever appearing on the gates 22 and 23, unless further control current is provided to oppose the bias, at least in part.

This control current is provided in a control winding 47 encircling both of the cores. One end of the control winding is connected to a tap 48 on the potentiometer 45 through a resistor 49. The other end of the winding 47 is coupled to the motor armature at a juncture of a pair of resistors 50 and 51 through a diode 52. These resistors 50 and 51 comprise a voltage divider across the armature 18 and so sense the armature voltage. The desired speed setting for the motor is established by setting in a position of the tap 48 which determines a control reference voltage for the control winding 47. The voltage between the tap 48 and the line 42 or the point 25 is thus balanced against the portion of the armature voltage which appears across the resistor 50. Accordingly, the setting of the potentiometer 45 determines, along with motor speed, the point at which the cores 37 and 38 are saturated during each half cycle. As the motor speed goes up the armature voltage will increase, bucking the reference voltage and causing the cores to saturate later in each half cycle and thus retarding the point at which firing potentials are applied to the gates. The motor speed will seek a balance condition wherein the portion of the armature voltage which appears across the resistor 50 bears some fixed ratio to the voltage between the tap 48 and the line 42, the difference being adequate to allow enough controlled rectifier current to flow during each half cycle so that the desired speed of the motor will be maintained for any load condition.

Figure 2:
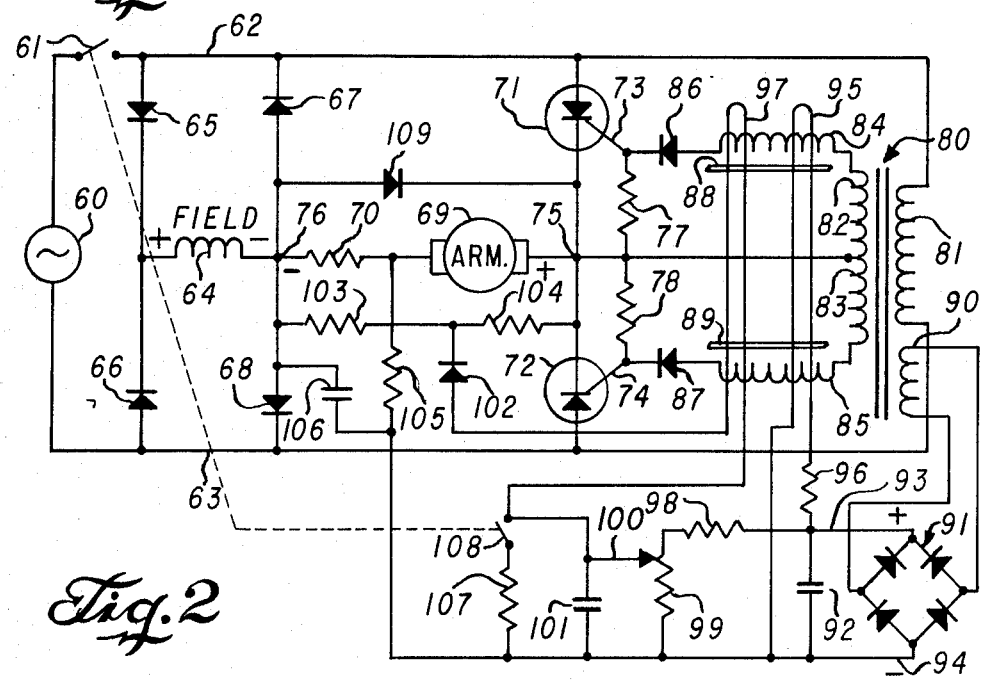
FIGURE 2 is a schematic diagram of another embodiment of the invention.

With reference to FIGURE 2, an embodiment of the invention is shown which utilizes a separate D.C. source for the bias and control voltages rather than the voltage from the field bridge. Also, this embodiment incorporates a feature which compensates for the IR drop in the armature. As above, an A.C. supply 60 is connected through a switch 61 to a pair of input lines 62 and 63. A shunt field winding 64 of the motor is connected to the lines by a full-wave-bridge rectifier including four diodes 65–68. An armature winding 69, in series with a resistor 70, is connected to the lines 62 and 63 by a second bridge rectifier including a pair of controlled rectifiers 71 and 72 along with the diodes 67 and 68. These controlled rectifiers include anodes connected to the lines 62 and 63, gates 73 and 74, and cathodes connected together at a junction 75. The diodes 67 and 68 are common to both of the bridge rectifiers and a juncture 76 between these two diodes provides a common negative terminal for both the field and the armature.

The gates 73 and 74 are driven by a saturable reactor arrangement including a transformer 80 having a primary winding 81 connected across the supply lines. A pair of secondary windings 82 and 83, having a common point coupled to the juncture 75, are connected to the gates through saturable-core reactors 84 and 85 and diodes 86 and 87. The windings 84 and 85 are on cores 88 and 89 which, absent further bias, would be saturated by current flowing in the reactors in directions permitted by the diodes. Bias and control currents for the saturable core reactors are provided by a D.C. source including a secondary winding 90 on the transformer 80 along with a bridge rectifier 91. A capacitor 92 connected across the output terminals of the bridge 91 smoothes out the rectifier A.C. to provide a fairly constant D.C. supply. A bias winding 95 surrounding both of the cores is connected to the lines 93 and 94 through a resistor 96. Current in the bias winding 95 is of such a magnitude as to saturate the cores 88 and 89 in a direction opposite to the flux produced by the reactor windings 84 and 85. A control winding 97 has applied thereto a control reference voltage derived from a voltage divider including a fixed resistor 98 and potentiometer 99 connected across the lines 93 and 94. A tap 100 on the potentiometer is directly connected to one end of the control winding 97, while a capacitor 101 shunts this tap to the line 94 to prevent rapid changes in the gating potentials. The other end of the winding 97 is connected by a diode 102 to the juncture of a pair of resistors 103 and 104 which are connected across the armature 69 to sense the armature voltage. To provide IR compensation, the line 94, which comprises the reference terminal of the control reference voltage, is connected to the series resistor 70 in the armature circuit through an RC filter including a resistor 105 and a shunt capacitor 106. Tracing the circuit of the winding 97, it is seen that the drop across the resistor 70 and the reference voltage provided between the line 94 and the tap 100 are additive and these voltages buck the drop across the resistor 103, which represents a portion of the armature voltage, this being related to the motor speed.

To prevent armature current from flowing until the field is built up upon starting, a small resistor 107 is connected between the tap 100 and the line 94 through a switch 108 which is mechanically coupled with the switch 61. These two switches have three positions—Off, Start, and Run. In the Off position the switch 61 is open, while at the Start position the switch 61 is closed along with the switch 108. This reduces the control voltage applied to the winding 97 to virtually zero, preventing the controlled rectifiers 71 and 72 from conducting at all. Immediately thereafter, giving the field a chance to build up, the switches are moved to the run condition wherein the switch 61 is closed and the switch 108 is open. This allows the control circuit to function as intended.

A diode 109 shunts the armature circuit of the motor and is effective to short any reverse voltage which would tend to be built up across the armature. The inductive load presented by the motor armature winding would attempt to maintain current to the controlled rectifiers after the points at which they should be turned off. Ordinarily this diode across the armature would not be required except at slow speeds where lack of the diode may tend to make the controlled rectifiers turn on during the first part of each cycle when they should be off until late in the cycle. The diode 109 also provides dynamic braking if the machinery attached to the motor should tend to turn the motor backwards. In this case the motor acts like a generator with a shorted armature.

Components which may be used in a practical embodiment of the circuit of FIGURE 2 are as follows:

| Component | Value |
| --- | --- |
| Diodes 65, 66, 86, 87, 91, 102 and 109 | 1N2069 |
| Diodes 67 and 68 | 1N1614 |
| Controlled rectifiers 71 and 72 | 2N1602 |
| Resistors 77 and 78 | 47 ohm |
| Resistor 96 | 2.2K |
| Resistor 98 | 3K |
| Resistor 99 | 2K |
| Resistor 103 | 330 |
| Resistor 104 | 2K |
| Resistor 105 | 3.3K |
| Capacitor 92 | 50 μfd |
| Capacitor 101 | 500 μfd |
| Capacitor 106 | 100 μfd |

The value of the resistor 70 would depend upon the size of the motor. For a ¼ H.P. motor, the resistor 70 may be 1 ohm.

Figure 3:
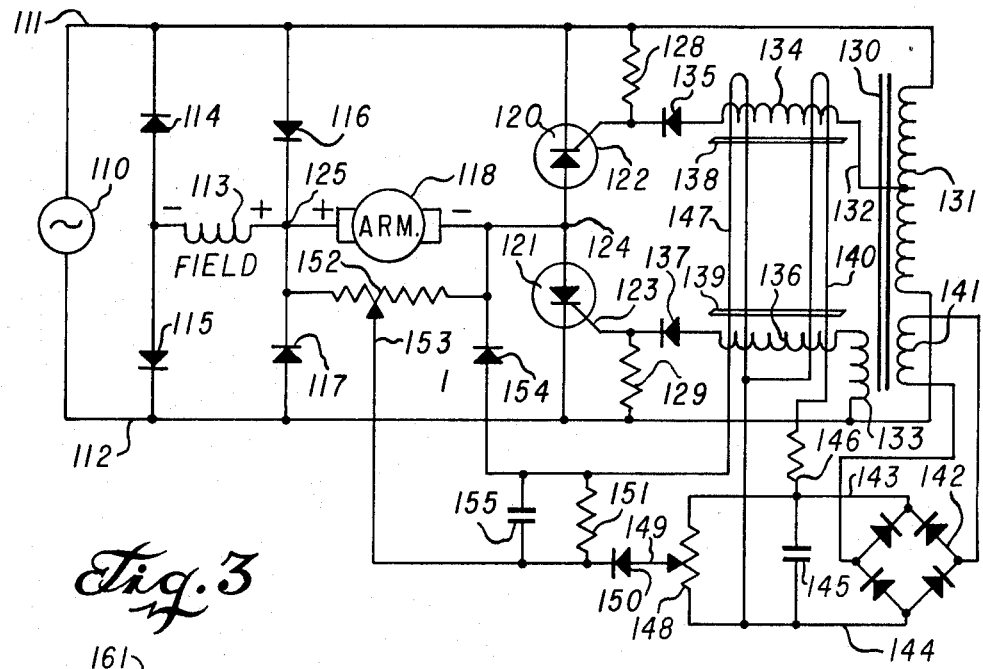
FIGURE 3 is a schematic diagram of a further embodiment of the invention.

With reference to FIGURE 3 an embodiment of the invention is shown wherein the controlled rectifiers are connected in the opposite sense in the bridge. In this circuit an A.C. supply 110 is connected to input supply lines 111 and 112 while a field 113 for the motor is connected to the supply lines by a full-wave-bridge rectifier including four diodes 114–117. An armature winding 118 is connected to these lines by another full-wave-bridge rectifier including a pair of controlled rectifiers 120 and 121 along with the diodes 116 and 117. The controlled rectifiers include cathodes connected to the lines 111 and 112, gates 122 and 123, and anodes connected together at a junction 124. A juncture 125 between the diodes 116 and 117 provides a common positive terminal for both the field and the armature, the diodes 116 and 117 being common to both bridge rectifiers. The gates 122 and 123 are shunted to the lines 111 and 112 by like resistors 128 and 129, and firing potentials are applied to these gates by an arrangement including a transformer 130 having a primary winding 131 connected across the supply lines. A tap 132 on the primary winding provides an A.C. voltage for one gate which is in phase with the supply, while a secondary 133 on the transformer 130 provides an A.C. voltage out of phase with the supply for the other gate. The tap 132 is connected to the gate 122 through a saturable core reactor 134 and a series diode 135. The secondary 133 is connected to the gate 123 through a saturable core reactor 136 and a series diode 137. The reactors 134 and 136 include cores 138 and 139 which have relatively square hysteresis loops and thus saturate at a selected level. A bias winding 140 surround both of the cores is supplied with a bias current provided by a rectifier arrangement including a secondary winding 141 on the transformer 130 along with a diode bridge 142. The output of this rectifier appearing on lines 143 and 144 is shunted by a capacitor 145 for smoothing purposes and the bias winding 140 is connected across this output through a resistor 146. A control winding 147 surrounding the cores is connected at one end to the line 144, a potentiometer 148 is connected across the auxiliary D.C. supply or the lines 143 and 144 and a tap 149 on this potentiometer is connected through a diode 150 and a series resistor 151 to the other end of the control winding 147. This provides a reference control current through the control winding determined by the setting of the tap 149, this being the desired speed setting. An opposing voltage will appear across the resistor 151 related to the armature voltage or motor speed. This voltage is provided by a potentiometer 152 which shunts the armature 118. A tap 153 on this potentiometer is connected to one terminal of the resistor 151 while the other terminal is connected to the negative side of the armature through a diode 154. The capacitor 155 shunts the resistor 151.

Figure 4:
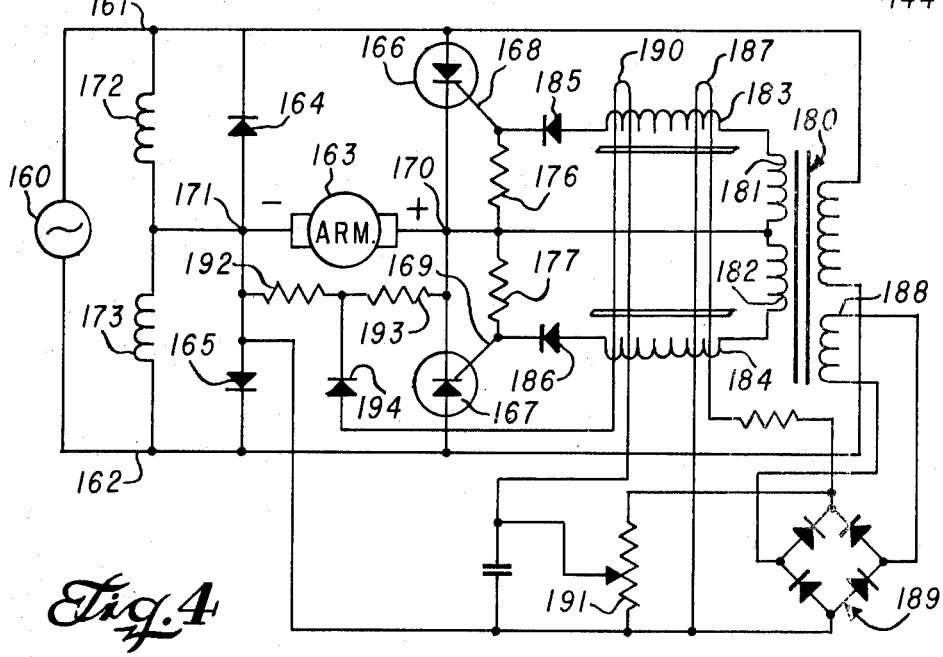
FIGURE 4 is a schematic diagram of an additional embodiment of the invention.

With reference to FIGURE 4 an embodiment of the invention is shown which utilizes a split field winding eliminating the need for two high current diodes. An A.C. supply 160 is connected to pair of input supply lines 161 and 162 while the armature of the shunt motor 163 is connected to the supply lines through a bridge rectifier including a pair of diodes 164 and 165 and a pair of controlled rectifiers 166 and 167. The controlled rectifiers include anodes connected to the lines 161 and 162, gates 168 and 169 and cathodes connected together at a juncture 170. The juncture 171 of the anode and the diodes 164 and 165 provides a negative terminal for the armature and a negative terminal for both of the field windings. The shunt field includes two windings, one of these being ordinarily associated with one pole of a two pole motor and the other associated with the opposite pole. Usually the field windings in a shunt motor are connected together and only two terminals brought out to the exterior of the motor. However, in this embodiment the juncture of the two windings is connected to the juncture 171 of the diodes in the armature bridge. The remaining terminals of the field windings 172 and 173 are connected to the lines 161 and 162. In this arrangement, when the line 161 is positive with respect to line 162 current will flow in the field winding 172 in the direction permitted by the diode 165. When the line 162 is positive, however, current will flow in the field winding 173 in the direction permitted by the diode 164.

The gates 168 and 169 are shunted to the juncture 170 by a pair of resistors 176 and 177. Firing potentials are applied to these gates from an arrangement including a transformer 180 having a primary connected to the supply lines. A pair of secondary windings 181 and 182 on this transformer have a common point connected to the juncture 170 of the cathodes of the controlled rectifiers. The secondary windings are connected to the gates through saturable core reactors 183 and 184 along with series diodes 185 and 186. A bias winding 187 surrounds the cores of the saturable reactors and is connected to an auxiliary D.C. source provided by a secondary 188 on the transformer 180 along with a diode bridge 189. Control current is supplied to a control winding 190 surrounding the saturable cores by means of a tap on a potentiometer 191 which is connected across the output of the diode bridge 189, this tap being shunted by a delay capacitor. One end of the control winding 190 is connected to a voltage divider including a pair of resistors 192 and 193 shunting the armature 163 by a diode 194. The operation of this embodiment is similar to that of FIGURE 1 above.

While this invention has been described with reference to illustrative embodiments, this description is not meant to be construed in a limiting sense. It is, of course, understood that various modifications may be made by persons skilled in the art, and so it is contemplated that the appended claims will cover any such modifications as fall within the true scope of the invention.

What is claimed is:
1. In power supply apparatus:
   (a) an A.C. source,
   (b) a controlled rectifier having an anode, a cathode and a gate,
   (c) a variable load connected in series with said A.C. source and the anode and cathode of said controlled rectifier,
   (d) a saturable core reactor coupled between said A.C. source and the gate of said controlled rectifier,
   (e) a bias winding and a control winding encircling the core of said reactor,
   (f) a bias voltage source coupled to said bias winding to provide current therein tending to saturate said core in a direction opposing conduction through said reactor from the A.C. source to the gate,
   (g) a variable reference voltage source adapted to provide a reference voltage related to a selected load voltage,
   (h) resistance means coupled across said load and exhibiting a potential related to the actual load voltage,
   (i) and conductive means connecting said reference voltage source and said resistance means in series opposition across said control winding, the reference voltage being poled to bias said core in a direction opposite to the effect of said bias winding.

2. A motor control circuit comprising:
   (a) an A.C. source having a pair of terminals,
   (b) a pair of controlled rectifiers each having an anode, a cathode and a gate, the cathode of each said rectifier being connected to one of said terminals and the anodes thereof having a common connection,
   (c) an armature winding for the motor connected in series with said A.C. source and the anode and cathode of each said controlled rectifier,
   (d) a pair of saturable core reactors each coupled between said A.C. source and the gate of one of said controlled rectifiers,
   (e) a single bias winding and a single control winding encircling the core of each said reactor,
   (f) a bias voltage source coupled to said bias winding to provide current therein adapted to saturate said core in a direction opposing condition through the reactors from the A.C. source to the gate,
   (g) a variable reference voltage source adapted to provide a reference voltage related to a selected motor speed,
   (h) resistance means coupled across said armature winding and exhibiting a potential related to the actual motor speed,
   (i) and conductive means connecting said reference voltage source and said resistance means in series opposition across said control winding, the reference voltage being poled to tend to saturate said cores in a direction opposite to the effect of said bias winding.

3. Apparatus according to claim 2 wherein a field winding for said motor is connected to said A.C. source through rectifying means.

4. Apparatus according to claim 3 wherein said bias voltage source and said reference voltage source include said rectifying means.

5. A motor control circuit comprising:
   (a) an A.C. source having first and second terminals,
   (b) a pair of oppositely-poled diodes connected in series between said first and second terminals,
   (c) a pair of oppositely-poled controlled rectifiers connected in series between said first and second terminals to provide a full-wave bridge rectifier with said pair of diodes, each of said controlled rectifiers including an anode, a cathode and a gate, the cathodes being connected together at a juncture,
   (d) an armature winding for said motor connected between the juncture of said cathodes and the juncture of said pair of diodes,
   (e) a pair of saturable core reactors, each being coupled from said A.C. source to the gate of one of said pair of controlled rectifiers to provide firing potentials thereto,
   (f) a bias winding and a control winding encircling the cores of said pair of reactors,
   (g) a bias voltage source coupled to said bias winding to provide current therein tending to saturate said cores in directions opposing conduction through said reactors from the A.C. source to the gates of the controlled rectifiers, (h) a variable reference voltage source adapted to provide a reference voltage related to a selected motor speed, (i) resistance means coupled across said armature winding and exhibiting a potential related to the actual motor speed, (j) and conductive means connecting said reference voltage source and said resistance means in series opposition across said control winding, the reference voltage tending to saturate said cores in directions opposite to the effect of said bias winding.

References Cited by the Examiner
UNITED STATES PATENTS

| | | | |
|---|---|---|---|
| 2,100,715 | 11/1937 | Jenks | 318—345 |
| 2,325,092 | 7/1943 | Andrews | 318—331 |
| 2,516,568 | 7/1950 | Haneiko | 318—345 |
| 2,522,520 | 9/1950 | Knauth et al. | 318—345 |
| 2,573,849 | 11/1951 | Knauth et al. | 318—345 |
| 2,899,620 | 8/1959 | Anger et al. | 318—345 |

ORIS L. RADER, *Primary Examiner.*